Patented Oct. 25, 1927.

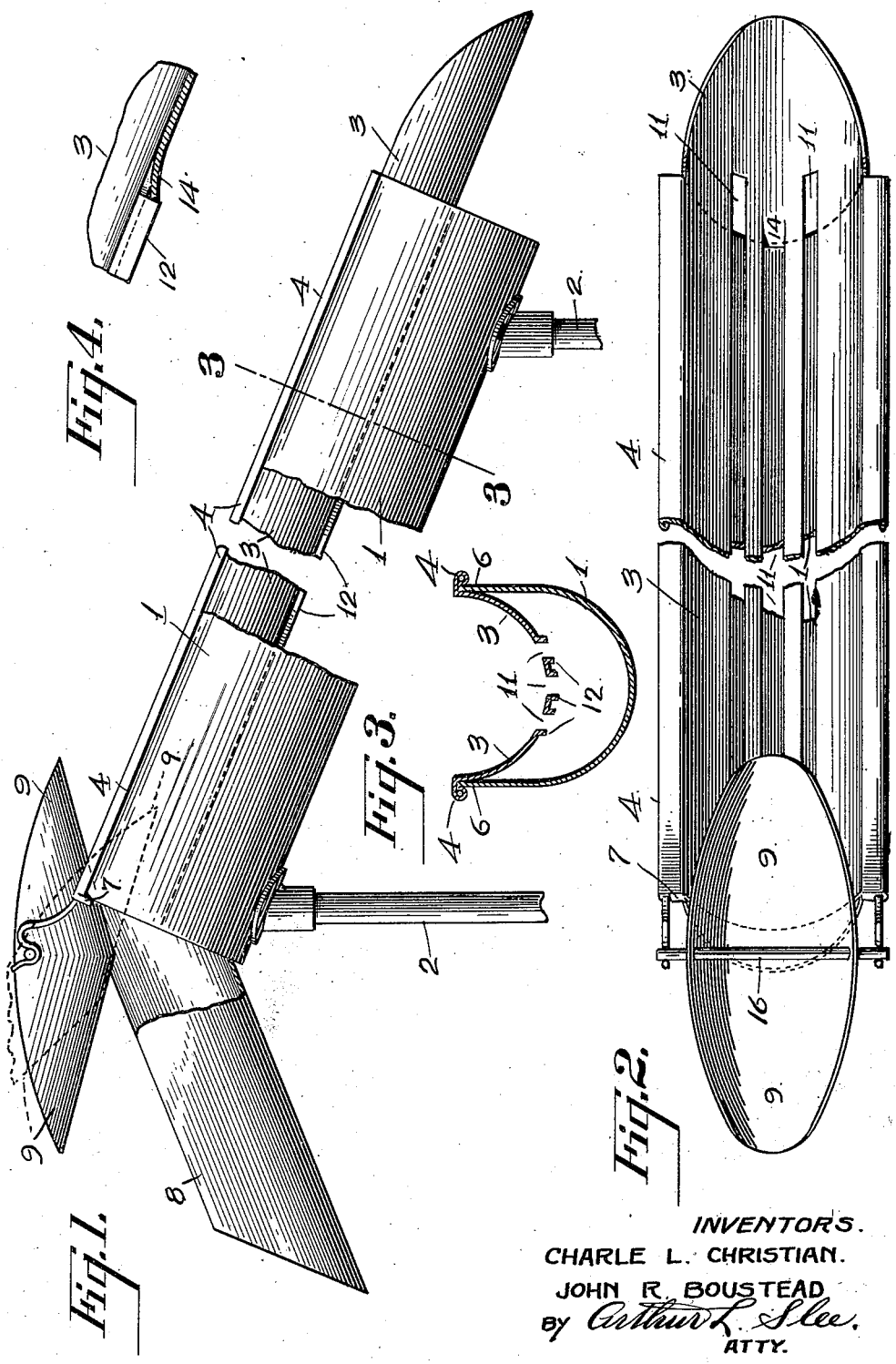

1,646,682

UNITED STATES PATENT OFFICE.

CHARLES L. CHRISTIAN, OF SAN FRANCISCO, AND JOHN R. BOUSTEAD, OF OAKLAND, CALIFORNIA.

EGG SEPARATOR.

Application filed September 24, 1925. Serial No. 58,334.

Our invention relates to improvements in egg separators, wherein upper and lower inclined troughs operate in conjunction with longitudinal slots in said upper trough to separate the albumen from the yolks of eggs when broken and deposited, minus the shell, in the upper end of the upper trough.

The primary object of the present invention is to provide a new and improved egg separator.

Another object is to provide a new and improved egg separator of simple and efficient construction and operation, whereby the albumen and yolks of eggs may be quickly and completely separated.

A further object is to provide a new and improved device of the character set forth having means for inspecting the contents of the egg before separation in order to prevent contamination of previously separated albumen and yolks.

A still further object is to provide improved means for discharging contaminated egg contents away from the separator;

Another object is to provide an improved device of the type described wherein means are provided for tripping partly separated albumen into its proper channel.

We accomplish these and other objects by means of the improved device disclosed in the drawings forming a part of the present specification wherein like characters of reference are used to designate similar parts throughout the said specification and drawings, and in which—

Fig. 1 is a broken side elevation, partly in section, of our improved egg separator;

Fig. 2 is a broken plan view thereof, with the discharge trough removed;

Fig. 3 is a transverse sectional view taken on line 3—3 of Fig. 1.

Fig. 4 is a broken detailed sectional view disclosing what we term the albumen trip.

Referring to the drawings the numeral 1 is used to designate a lower inclined trough, preferably semi-circular in the bottom portion thereof, and supported in such inclined position by means of suitable supports or standards 2. Detachably mounted within the upper portion of the lower inclined trough we have provided an upper inclined trough 3 whose lower end projects beyond the lower end of the lower inclined trough 1, as disclosed in Fig. 1 of the drawings, the purpose of which will hereinafter be more fully set forth.

The upper trough 3 is detachably mounted upon the lower trough 1 in order that the said troughs 1 and 3 may be readily and easily separated for cleansing purposes. The edges of the upper trough 3 are turned outwardly to form supports to detachably engage the upper edges 6 of said lower trough 1. In order to prevent the said upper trough 3 from sliding downwardly upon said upper edges 6 lateral extensions 7 are provided to engage the upper ends of the edges 6, as disclosed in Figs. 1 and 2 of the drawings.

A discharge trough 8 is secured to the upper end of the lower trough 1 and inclined oppositely thereto in order to conduct contaminated eggs away from the separator.

Pivotally mounted, preferably upon the upper end of the upper trough 3 we have provided what we term a receiver 9 into which eggs to be separated are broken and the contents thereof emptied to permit individual inspection of the egg contents before being passed to the separator to prevent contamination of previously separated albumen and yolks.

The separator proper is within the upper trough 3 and consists of a plurality of longitudinally disposed slots 11 in the bottom portion of said upper trough 3, as disclosed in Fig. 2 of the drawings. These slots are formed preferably by bending back equal portions of the material of which the bottom of the upper trough 3 is composed in order to provide sustaining or reinforcing flanges 12 to strengthen the material of the upper trough 3 remaining between said slots, by means of which arrangement the rigidity of the members or strips between said slots 11 and thereby the alignment and width of the slots is maintained.

In the bottom of the central or any other slot 11 we have provided what we term a trip 14 which is provided by bending a portion of the material of the bottom of the upper trough 3 slightly downward and over a width approximately equal to the width of the slot. This trip, we have found from actual experience, has a tendency to trip or remove any accumulation of albumen which straddle the bars or material between the slots and ride to the bottom edges or ends of said slots. Where the lower ends of the slots 11 are alined there is sometimes a tendency of said alined ends to trip the accumulated albumen over the upper edges of said slots and into the discharging end of the upper trough 3, but by advancing one end of one of the slots it tends to form a trip and unbalance any accumulation of albumen which may be practically balanced upon the bars or material between said slots 11.

In order to facilitate the operation of breaking and depositing the contents of eggs within the receiver 9 we have provided what may be termed an egg breaker and consists of a transverse bar 16, which bar 16 may be beveled or sharpened on its upper end and extend externally of said receiver 9 to form pivots 17 thereof as disclosed in Figs. 1 and 2 of the drawings. By arranging the egg breaker directly within the egg receiver 9 a loss of albumen, which sometimes takes place when the egg is cracked or broken at any remote point and then conveyed to a point over the receiver 9, is prevented.

In operation the egg, not shown, is cracked or broken upon the egg breaker 16 and the shell of said egg is separated and the contents of said shell is emptied directly within the receiver 1 for individual inspection. If the egg is contaminated the receiver is tilted in a direction which will deposit the contents into the discharge trough 8 by which it is carried into any suitable receptacle, not shown, placed under the lower end of the said discharge trough 8. The receiver 9 is then lifted off of its pivots and washed to prevent contamination of successive egg contents emptied thereinto.

If the contents of the egg, after reception into the receiver 9, pass inspection as being suitable for food and cooking purposes, the said receiver 9 is tilted toward the upper trough 3 which deposits the egg contents, or yolk and albumen, into the upper end of the upper trough 3. The attraction of gravity and the inclination of the upper trough 3 will cause the albumen and yolk, not shown, to move downwardly in the upper trough and as the albumen possesses a greater fluidity than the semi-rigid yolk, said albumen readily flows through the longitudinal slots 11 into the lower trough 1, and the yoke rides or slides down the bars formed between the slots 11 and is discharged into any suitable receptacle, not shown, placed under the lower or discharging end of the upper trough 3, while the albumen flows down the lower trough 1 and is discharged from the end thereof into its receptacle, not shown.

By the novel feature of making the upper and lower troughs 3 and 1, respectively, as well as the receiver 9, detachable, the parts may be readily separated for cleansing purposes, and the device may thereby easily be kept in a sanitary condition.

Having thus described our invention, we claim as new and desire to secure by Letters Patent:

1. An egg separator comprising a lower inclined trough; an upper inclined trough detachably mounted within the upper portion of the lower trough and having the lower end of said upper trough extending beyond the lower end of the lower trough, said upper trough being also provided with a plurality of longitudinally extending parallel slots in the bottom thereof arranged to permit the passage of albumen and to prevent the passage of the yolk of an egg through said slots into the lower trough; one of said slots having its lower end advanced upwards beyond the ends of the other slots and a trip formed in the lower end of the advanced slot by a downward bent portion of said bottom, the trip being approximately of the width of the advanced slot and arranged to trip albumen through said lower end of the slot.

2. An egg separator comprising a lower inclined trough; an upper inclined trough detachably mounted within the upper portion of the lower trough and having the lower end of said upper trough extending beyond the lower end of the lower trough, said upper trough being also provided with a plurality of longitudinally extending parallel slots in the bottom thereof arranged to permit the passage of albumen and to prevent the passage of the yolk of an egg through said slots into the lower trough one of said slots having its lower end advanced upward beyond the ends of the other slots; a discharge trough attached to the upper end of the lower trough and oppositely inclined therefrom; a receiver mounted at the upper ends of the troughs and arranged to deposit the contents of an egg broken thereinto into the upper end of the upper trough when said receiver is tilted in one direction and to deposit said contents into the discharge trough when tilted in an opposite direction; a trip formed in the lower end of the advanced slot by a downward bent portion of said bottom, the trip being approximately of the width of the advanced slot and arranged to trip albumen through said lower end of the slot; and an egg breaker arranged within the receiver whereby eggs may be cracked directly therein to prevent loss of albumen.

In witness whereof we have hereunto set our signatures.

CHARLES L. CHRISTIAN.
JOHN R. BOUSTEAD.